US011989582B2

(12) United States Patent
Guilford et al.

(10) Patent No.: US 11,989,582 B2
(45) Date of Patent: May 21, 2024

(54) APPARATUS AND METHOD FOR LOW-LATENCY DECOMPRESSION ACCELERATION VIA A SINGLE JOB DESCRIPTOR

(71) Applicant: Intel Corporation, Santa Clara, CA (US)

(72) Inventors: James Guilford, Northborough, MA (US); George Powley, Northborough, MA (US); Vinodh Gopal, Westborough, MA (US); Wajdi Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 17/033,760

(22) Filed: Sep. 26, 2020

(65) Prior Publication Data

US 2022/0100526 A1     Mar. 31, 2022

(51) Int. Cl.
    *G06F 9/38*            (2018.01)
    *G06F 9/48*            (2006.01)

(52) U.S. Cl.
    CPC .......... *G06F 9/4881* (2013.01); *G06F 9/3887* (2013.01); *G06F 2209/483* (2013.01)

(58) Field of Classification Search
    CPC . G06F 9/4881; G06F 9/3887; G06F 2209/483
    See application file for complete search history.

(56) References Cited

U.S. PATENT DOCUMENTS

| 2014/0032516 | A1* | 1/2014 | Sukhwani | G06F 16/211 707/705 |
| 2014/0208069 | A1* | 7/2014 | Wegener | H04L 12/00 712/22 |
| 2019/0266069 | A1* | 8/2019 | Schluessler | G06F 9/5038 |

* cited by examiner

*Primary Examiner* — Brian W Wathen
(74) *Attorney, Agent, or Firm* — NICHOLSON DE VOS WEBSTER & ELLIOTT LLP

(57) ABSTRACT

Apparatus and method for performing low-latency multi-job submission via a single job descriptor is described herein. An apparatus embodiment includes a plurality of descriptor queues to stores job descriptors describing work to be performed and enqueue circuitry to receive a first job descriptor which includes a first field to store a Single Instruction Multiple Data (SIMD) width. If the SIMD width indicates that the first job descriptor is an SIMD job descriptor and open slots are available in the descriptor queues to store new job descriptors, then the enqueue circuitry is to generate a plurality of job descriptors based on fields of the first job descriptor and to store them in the open slots of the descriptor queues. The generated job descriptors are processed by processing pipelines to perform the work described. At least some of the generated job descriptors are processed concurrently or in parallel by different processing pipelines.

25 Claims, 14 Drawing Sheets

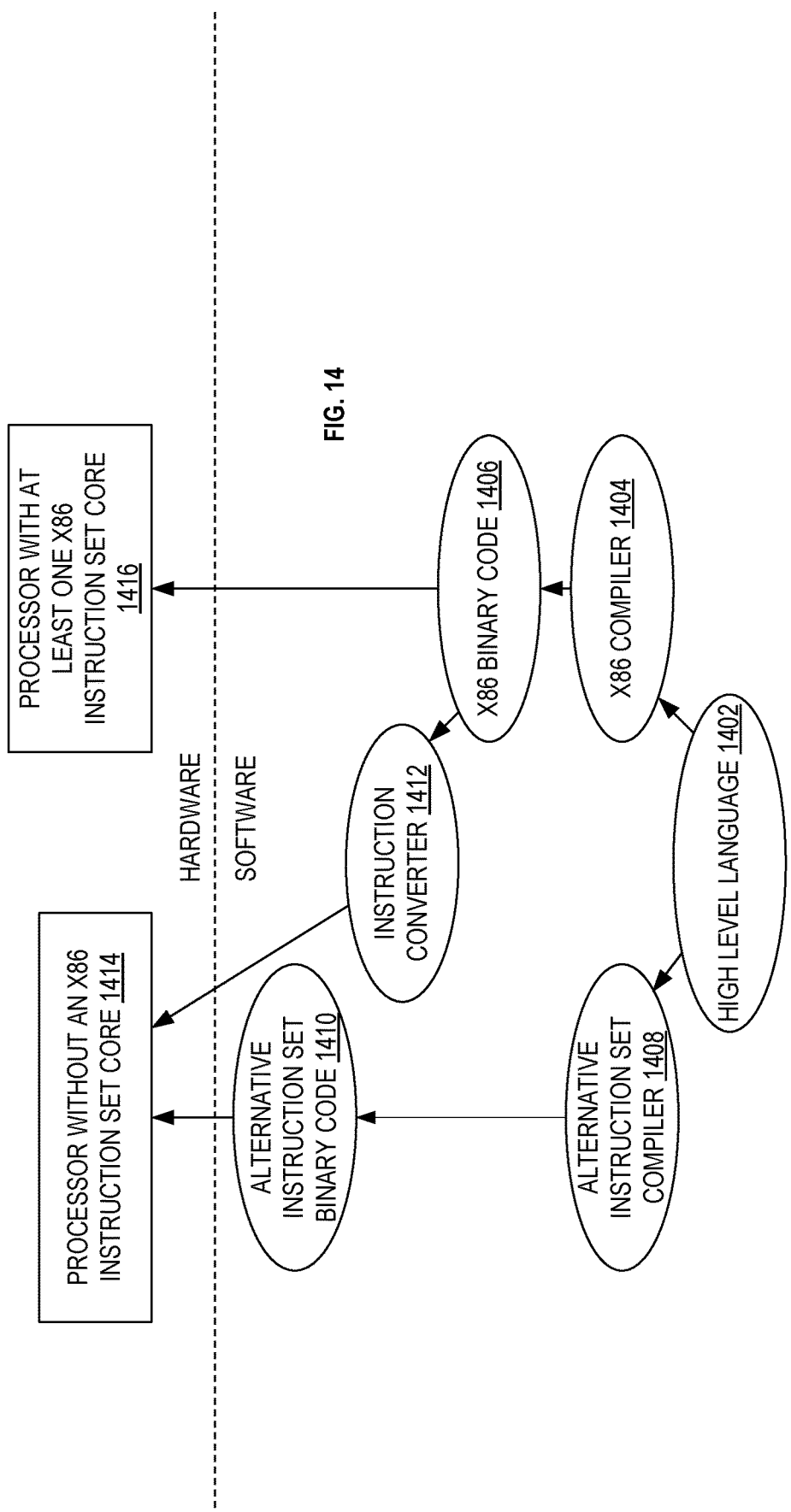

APPARATUS AND METHOD FOR LOW-LATENCY DECOMPRESSION ACCELERATION VIA A SINGLE JOB DESCRIPTOR

TECHNICAL FIELD

Embodiments of the invention described herein relate generally to the efficient utilization of accelerators to perform work in a computer processing system. In particular, the disclosure relates to low-latency submission of multiple jobs to a hardware accelerator via a single job descriptor.

BACKGROUND ART

In computing, accelerators are specialized computing devices designed to perform certain functions more efficiently than is possible by software running on a general-purpose central processing unit (CPU). For example, visualization processes may be offloaded from the CPU onto a graphics card to enable faster, higher-quality playback of videos and games. Similarly, compression and decompression workloads that are computationally intensive may be better suited for specialized encoders and decoders rather than the CPU. Efficient use of accelerators can decrease latency, increase throughput, and free up CPU utilization.

BRIEF DESCRIPTION OF THE DRAWINGS

The invention may best be understood by referring to the following description and accompanying drawings that are used to illustrate embodiments of the invention. In the drawings:

FIG. 14 illustrates a block diagram contrasting the use of a software instruction converter to convert binary instructions in a source instruction set to binary instructions in a target instruction set according to embodiments of the invention.

DETAILED DESCRIPTION

Figure 1:
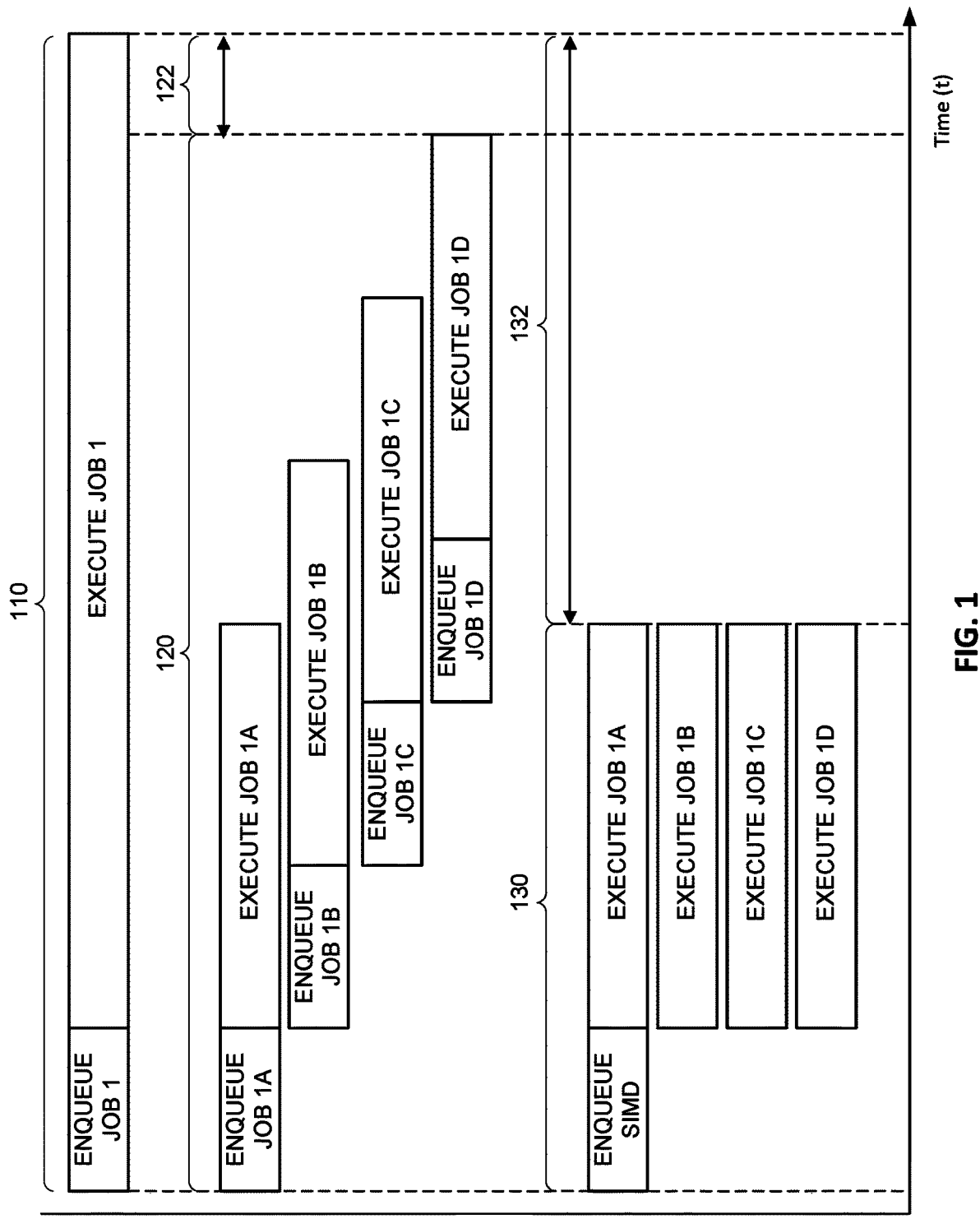
FIG. 1 illustrates a performance comparison between ways to submit a large job to a hardware accelerator according to embodiments of the present invention.

Embodiments of apparatus and method for low-latency decompression acceleration via a single job descriptor are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

In computing, accelerators are specialized computer devices designed to perform certain functions more efficiently than is possible by software running on a general-purpose central processing unit (CPU). Accelerators may be implemented in hardware or as a combination of both hardware and software. When software on a CPU sends work to be performed on an accelerator, the CPU creates a description of the work known as a job descriptor (descriptor). The job descriptor may be submitted to the accelerator via special instructions. In some implementations, after a descriptor is sent, submission of more descriptors is blocked until a response is returned informing the CPU, or the software running thereon, about whether the descriptor was successfully received by the accelerator. This allows software threads to submit jobs without having to synchronize with each other or with the accelerator. This also removes the need for software to track the accelerator queue occupancy. In contrast, some implementations operate under the assumption that it is up to the CPU or the software to know whether the accelerator is available to receive new jobs. Under this type of implementation, the CPU and the software have to carefully manage submissions to ensure jobs are not accidentally dropped due to the availability of the accelerator.

A critical usage for hardware accelerators is DRAM memory tiering via compression. This is typically managed by the operating system (OS) or the virtual machine monitor (VMM) and is transparent to applications. During operation, the OS or VMM tracks accesses to memory pages to identify hot and cold pages. Hot pages refer to pages that are frequently accessed while cold pages are those that are accessed less frequently or not accessed at all. To free up memory space, pages that are identified as cold pages are compressed and stored into a specified region of the memory (e.g., special tier memory region). When a code page is later accessed, a page fault occurs because an uncompressed version of the requested page is not readily available in memory. To fulfill such page request, once the OS handler determines that a compressed version of a requested page exists in the special tier memory region, a job is submitted via a descriptor to instruct the hardware accelerator to retrieve and decompress the requested page. The latency incurred from the decompression operation has a direct and significant impact on software and application performance. This is especially apparent as the capacity for storing compressed pages increases. For example, as the size of the special tier memory region grows, more and more pages may be compressed and stored into the region As a result, there is a higher chance of warmer pages being stored into the special memory region and later needing to be decompressed. This, in turn, can have an adverse impact on the overall CPU and software performance.

Even though the decompression of memory pages is an inherently sequential process posing fundamental limits on processing speeds that are difficult to overcome, there are ways to improve its efficiency through parallel processing. One way to speed up decompression of a page is to initially compress the page into multiple independent chunks (typically 2 or 4) and later, when the page is needed, to decompress each independent chunk on different accelerators or different processing pipelines within an accelerator. After the chunks are decompressed, they are combined to generate the requested page.

Submitting a subdivided page to an accelerator for decompression typically requires submitting multiple jobs, one for each chunk. Since a unique descriptor must be submitted for each job, a large amount of overhead and latency are introduced to the decompression process which can negate much of the savings gained therefrom. An aspect of the present invention sought to reduce the overhead and latency by providing a method to submit multiple jobs using only a single descriptor. According to some embodiments, a special Single Instruction Multiple Data (SIMD) descriptor is used to define multiple, and often-times similar, jobs for the accelerator. The use of SIMD descriptor allows for the submission of multiple jobs at the same time. In one embodiment, no change is made to the instructions and/or the processes for submitting a descriptor. Rather, extensions are defined to the commands and operations supported by the accelerator. In one embodiment, the use of the SIMD descriptor does not incur any additional latency such as extra memory accesses that are commonly associated with batch mode submissions.

FIG. 1 illustrates a performance comparison between the different ways to submit a large job to an accelerator. Imagine a large job (Job 1) containing independent work that can be divided and processed concurrently on multiple processing pipelines. If Job 1 is submitted as a single job using a single job descriptor, the time it takes to enqueue and execute Job 1 is shown as 110. However, if Job 1 were to be divided into four parts (Jobs 1A, 1B, 1C, and 1D) and submitted to different processing pipelines using four job descriptors, the time it takes to enqueue and execute the four job descriptors is shown as 120. As noted above, in some implementations, while a job descriptor submitted for job 1A is being processed or enqueued, the operating system or the software executed thereon is blocked from submitting another descriptor to enqueue job 1B until a response from enqueuing Job 1A has returned. Similarly, a job request to enqueue Job 1C cannot be submitted until a response for enqueuing Job 1B has returned and so on. Thus, even though it is more efficient to submit four smaller jobs to different processing pipelines of an accelerator rather than one large job, the latency saved, shown as 122, is greatly reduced by the overhead associated with the sequential submission and processing of multiple descriptors. To address this deficiency, an embodiment of the present invention utilizes an SIMD descriptor to minimize the overhead by reducing the number of job descriptors required to enqueue the four jobs down to one. The time it takes to enqueue and execute the four jobs using an SIMD descriptor is shown as 130. The use of SIMD descriptor maximizes the latency savings 232 over other approaches.

Figure 2:
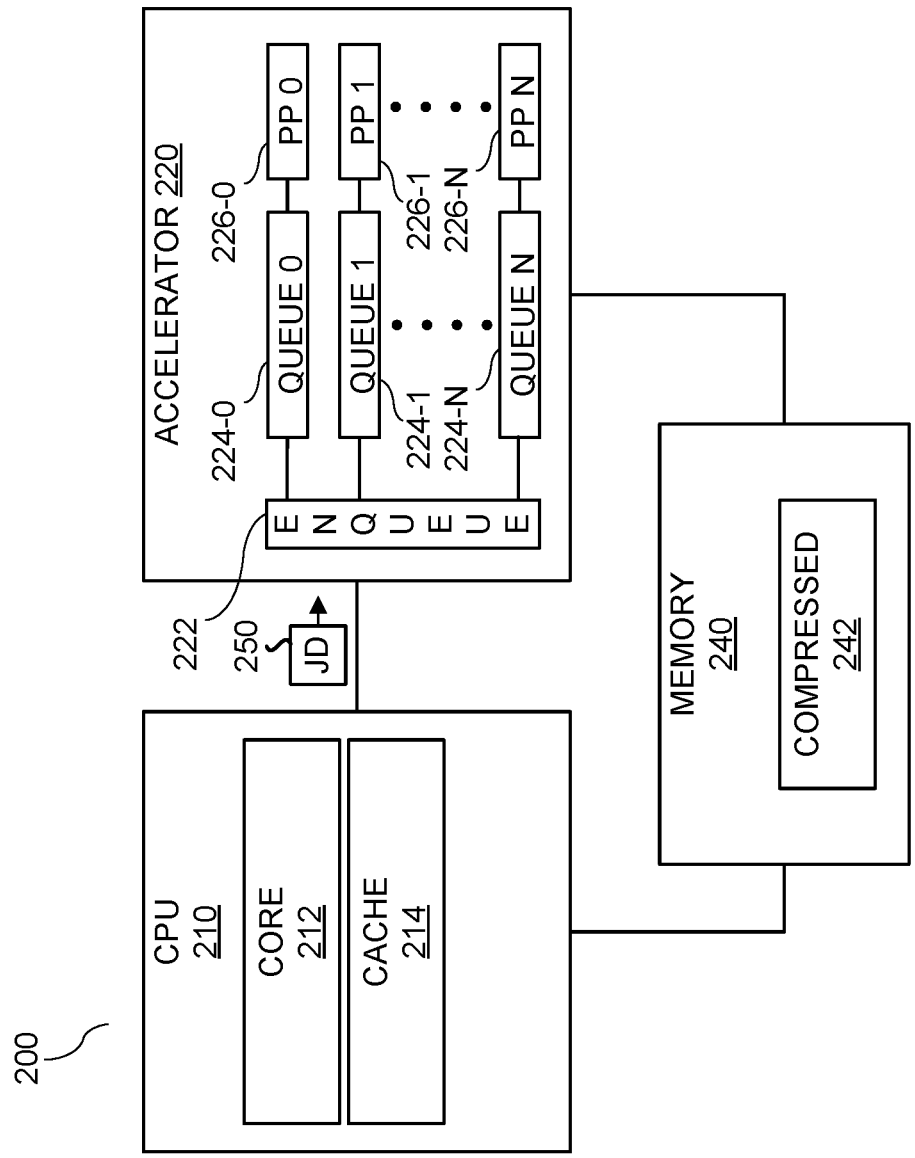
FIG. 2 illustrates a system embodiment on which various aspects of the present disclosure may be implemented.

FIG. 2 is a block diagram illustrating a system embodiment of the present invention. System 200 includes a central processing unit (CPU) 210 and an accelerator 220. The accelerator 220 may be implemented in hardware, software, or a combination thereof. Both the CPU and accelerator are communicatively coupled to memory 240, which may include specific region 242 to store compressed memory pages. CPU 210 may additionally include one or more processor cores 212 and one or more levels of cache 214. The accelerator 220 may include enqueue circuitry 222 that is coupled to one or more descriptor queues 224-0 to 224-N. Each of the descriptor queues 224 may further be coupled to one or more processing pipelines 226. The enqueue circuitry 222 is responsible for receiving job descriptors, such as job descriptor 250 issued by CPU 210, and enqueuing them into the descriptor queues 224. The processing pipelines 226 retrieve descriptors from the descriptor queues 224 and perform the work described by each descriptor. While only one accelerator 220 is shown in FIG. 2, one skilled in the art will recognize that any number of accelerators may be communicatively coupled to the enqueue circuitry. Each of the accelerators may contain any number of descriptor queues and processing pipelines.

Figure 3:
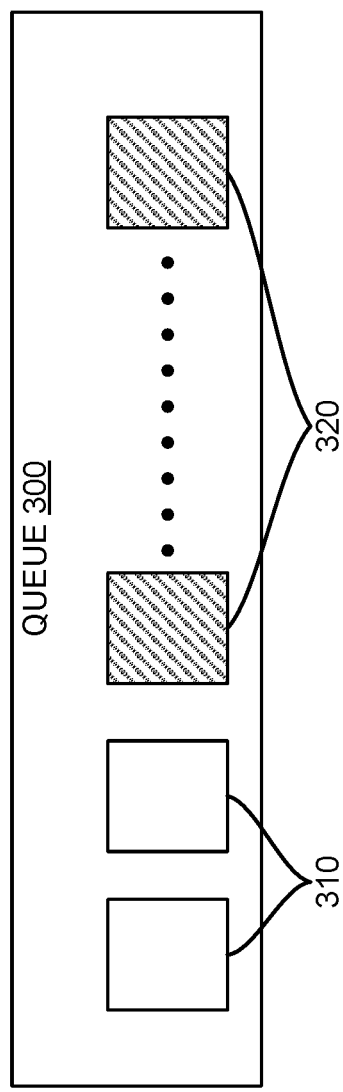
FIG. 3 is a block diagram illustrating an embodiment of a job descriptor queue for storing job descriptors.

FIG. 3 is a block diagram of an embodiment of a descriptor queue for storing the job descriptors. The descriptor queue 300 may include any number of descriptor slots for storing job descriptors. As illustrated, slots 320 illustrate slots of the descriptor queue that are occupied while slots 310 illustrate slots that are open and available to receive new job descriptors. In one embodiment, the descriptor queue 300 is implemented as a first in first out (FIFO) queue where earlier-received job descriptors are processed by the processing pipeline before later-received ones are processed. It will be appreciated, however, the any type of queueing method, such as last in first out (LIFO) or priority-based queuing, may be used.

Figure 4:
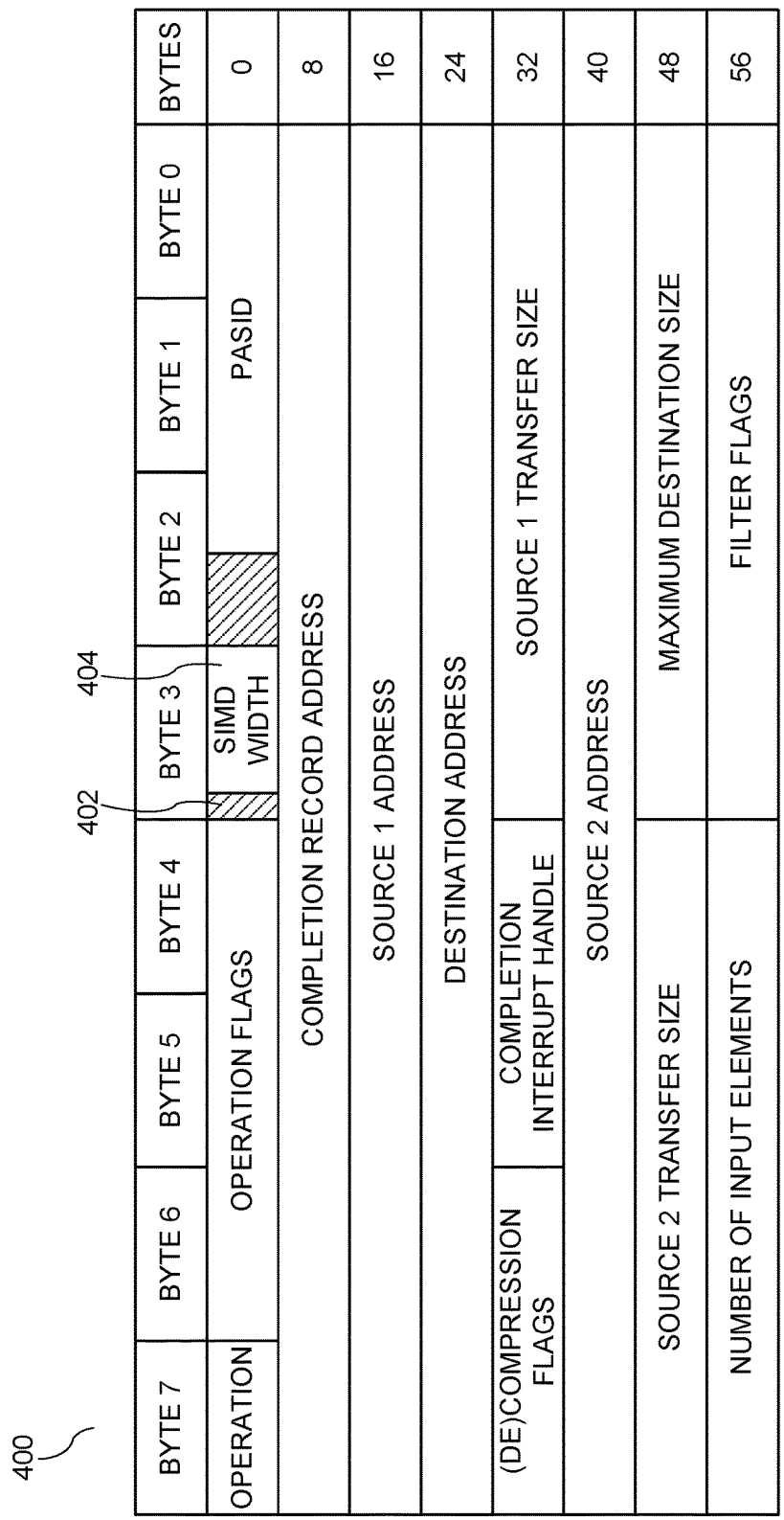
FIG. 4 is a block diagram illustrating fields of a job descriptor according to an embodiment.

According to an embodiment, one approach to implement an SIMD descriptor is to encode an "SIMD Width" into the descriptor. FIG. 4 illustrates an exemplary job descriptor 400 that includes various fields. In one embodiment, an unused or reserved section of a descriptor may be modified to include an SIMD width field so as to minimize the impact to any existing processes or architectures. For example, bits 0 to 6 of an unused section 402 of the descriptor may be used to encode the SIMD width 404. This allows for an SIMD width that ranges from 1 (default, non-SIMD) to 128. It will be apparent to one of ordinary skill in the art that any number of bits may be used to encode the SIMD width, and that the range may vary depending on implementation needs.

In one embodiment, support for SIMD descriptors by an accelerator is implemented according to the following control flow:

1. Check if "SIMD Width" is greater than 1 (N>1) to identify an incoming SIMD descriptor.
2. Generate N descriptors without overflowing the downstream descriptor queues.
3. Use the following pseudo code to calculate the contents of variable descriptor fields. All other descriptor fields remain the same for the generated descriptors.
   for i=2 to N:
      Source 1 Address+=Source 1 Transfer Size
      Source 2 Address+=Source 2 Transfer Size
      Destination Address+=Maximum Destination Size
      Completion Record Address+=sizeof(Completion Record)

Figure 5:
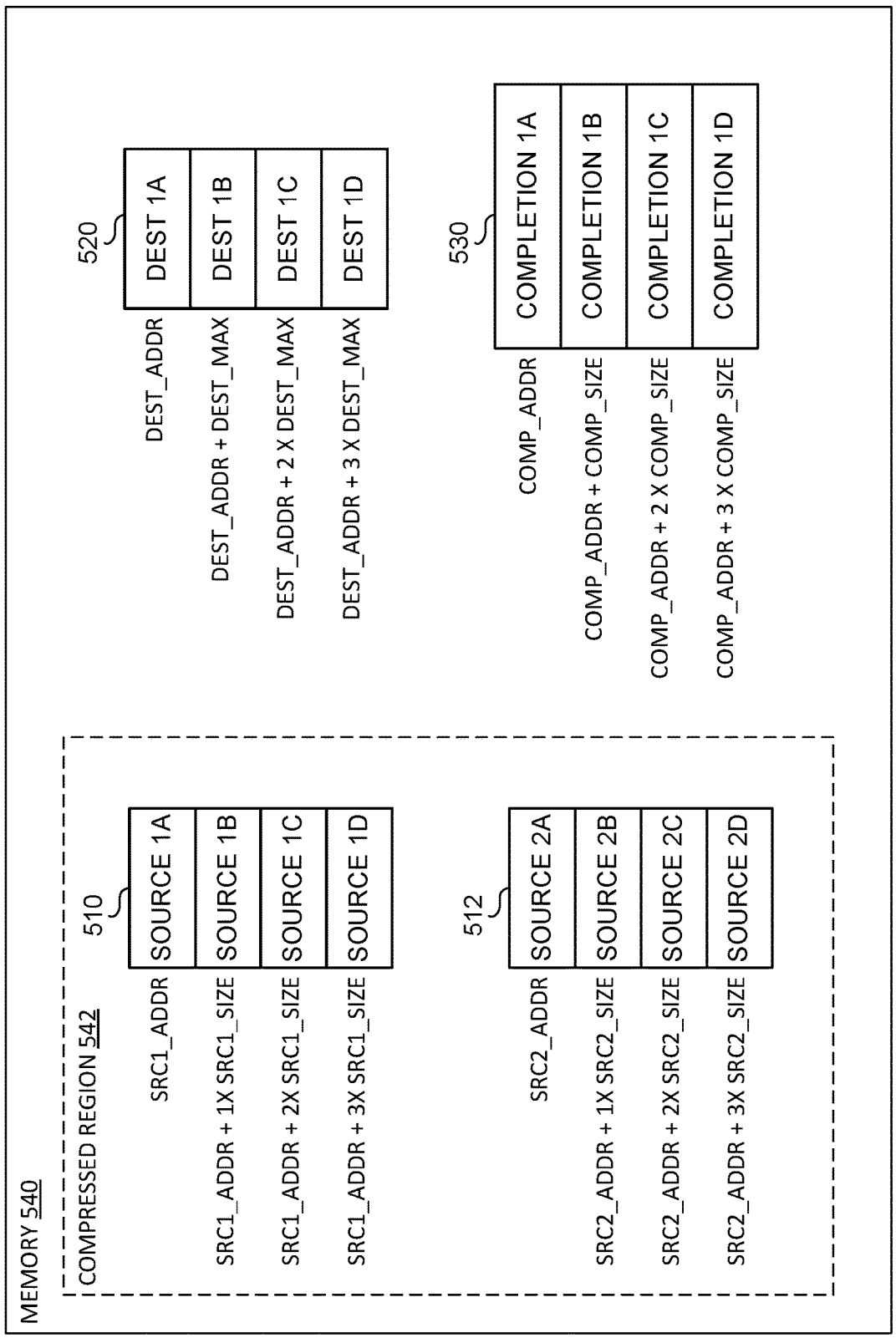
FIG. 5 illustrates various buffers in memory referenced by a single instruction multiple data (SIMD) job descriptor according to an embodiment.

According to the embodiment, to generate the first descriptor (i=1), the Source 1 Address, Source 2 Address, Destination Address, and Completion Record Address are simply copied over from the SIMD descriptor. Not generate the second descriptor (i=2) up to the Nth descriptor (i=N), each of the source 1, source 2, destination, and completion record addresses is calculated based on a respective starting address and a corresponding address size. For each of the generated job descriptors, the SIMD width may be set to 1. Under this implementation, all of the Source 1 inputs referenced by the source 1 address are of the same size and stored in buffers occupying contiguous regions of the memory. The same is true for the Source 2 inputs, Destination locations, and Completion Records. FIG. 5 illustrates the location of these buffers in memory according to an embodiment. Memory 540 may be the same as memory 240 of FIG. 2. In one embodiment, the source inputs may be compressed memory pages stored in buffers 510 and 512 that occupy contiguous spaces in a special region 542 of the memory. These pages may be decompressed and stored to destination buffers 520 identified by the destination addresses. The completion record addresses identify the locations 530 in memory in which the completion record each job are to be stored.

In other embodiments, the input and output buffers need not be in contiguous memory locations or have the same size. One way to allow for variable buffer addresses and sizes is to utilize indirection in which an address to a list of variable buffer addresses and sizes is provided by the job descriptor. This may sometimes be referred to as batch-mode. The use of such list, however, incurs an extra layer of latency due to additional accesses to the memory that are required. In contrast, one embodiment of the present invention utilizes information already contained within the job descriptor to generate various buffer addresses and sizes. While the description below focuses on 2 and 4 chunk splits (i.e. N=2 or 4), it can be appreciated that any number of chunks maybe used.

For N=2, according to an embodiment, the source 2 address field is re-purpose to store the address of the second chunk. This may be especially suitable for jobs that require only a single source, such as a 1-shot decompression job without other chained operations.

In one embodiment, the following pseudo code is used to calculate the contents of various descriptor fields for the new descriptor. Unless otherwise noted, all other descriptor fields are to remain same and thus may be reused or copied over to generate the new descriptor.
   for i==2:
      Source 1 Address=Source 2 Address
      Source 1 Transfer Size=Source 2 Transfer Size
      Destination Address+=Maximum Destination Size
      Completion Record Address+=sizeof(Completion Record)

According to this embodiment, the first descriptor generated retains the Source 1 Address, Destination Address, and Completion Record Address copied over from corresponding fields of the SIMD descriptor. For the second descriptor, the Source 1 Address and Transfer Size are set to the Source 2 Address and Transfer Size of the SIMD descriptor. The Destination Address and Completion Address are calculated based on a respective starting address and corresponding address size found in the SIMD descriptor.

For N=4, according to an embodiment, input/output buffers may be limited to specified lengths (i.e. 65K or less). In one embodiment, each of the two source address fields are used to store two packed addresses. For example, if the source 1 address field is a 32-bit field, a pair of 16-bit addresses may extracted from that field to be used as the source 1 address for two of the new job descriptors. Similarly, a pair of 16-bit addresses may be extracted from a 32-bit source 2 field to be used as the source 1 address for two other new job descriptors. This approach does not cause any practical restrictions as many of the critical latency-sensitive usages involve small data buffers of size 4K or less. The following pseudo code may be used to calculate the contents of variable descriptor fields according to an embodiment. Unless otherwise noted, all other descriptor fields are to remain same and thus may be reused or copied over to generate the new descriptors.
   for i==1:
      Source 1 Transfer Size &=0xFFFF//use low 16 bits
   for i==2:
      Source 1 Address+=Source 1 Transfer Size & 0xFFFF
      Source 1 Transfer Size=Source 1 Transfer Size>>16 II high 16 bits
      Destination Address+=Maximum Destination Size
      Completion Record Address+=sizeof(Completion Record)
   for i==3:
      Source 1 Address=Source 2 Address
      Source 1 Transfer Size=Source 2 Transfer Size & 0xFFFF
      Destination Address+=Maximum Destination Size
      Completion Record Address+=sizeof(Completion Record)
   for i==4:
      Source 1 Address=Source 2 Address+(Source 2 Transfer Size & 0xFFFF)
      Source 1 Transfer Size=Source 2 Transfer Size>>16 II high 16 bits
      Destination Address+=Maximum Destination Size
      Completion Record Address+=sizeof(Completion Record)

Besides utilizing SIMD job descriptors to submit multiple jobs to the accelerator, improvements may be made to the reporting of job status. According to an embodiment, a completion record is generated and saved to memory at the completion of each job to indicate that the job is finished. For jobs that are submitted using the SIMD job descriptor, the accelerator may additionally generate a combination completion record when all of the jobs generated from the same SIMD job descriptor have been completed. The combination completion record thus conveys the successful completion of the whole job set to the sender. In some embodiments, software may choose to wait for the combination completion record to ensure all of the jobs submitted using the SIMD job descriptor have finished before continuing. In some embodiments, this ensures that all of the chunks of a requested memory page have been decompressed and made available to the software. In other embodiments, instead of generating and storing a completion record for each job, a single combination completion record is used to indicate that all of the jobs generated from the same SIMD descriptor have been completed. This can greatly reduce data writes by the accelerator to memory.

To ensure that that jobs submitted via SIMD job descriptors are not accidentally dropped, additional synchronization mechanisms may be implemented. In one embodiment, when processing an SIMD job descriptor, the enqueue circuitry may first determines whether enough open slots are available in the descriptor queues to store all of the job descriptors that may be generated from the SIMD job descriptor. If there are not enough open slots to accommodate all of the job descriptors, the enqueue circuitry may abandon the enqueue request and ask the sender to retry at a later time. This is the all-or-nothing approach. In other embodiments, a partial set of the job descriptors included in the SIMD descriptor may be generated and enqueued to maximize accelerator utilization and minimize the number the jobs that have to be resubmitted. For example, suppose that an SIMD job descriptor attempts to enqueue 4 jobs when there are only 3 open slots. The enqueue circuitry may generate and enqueue a job descriptor for each of the first 3 jobs into the 3 open slots. The enqueue circuitry may further create a completion record for the fourth job with a "retry" status. When the requesting CPU or software accesses this completion record, it will know from the "retry" status that the accelerator is likely busy and thus may take additional time to process the first three jobs. The requesting CPU or software can then decide whether to perform the fourth job through different method, such as a software routine, or to resubmit the fourth job to the accelerator at a later time.

Figure 6:
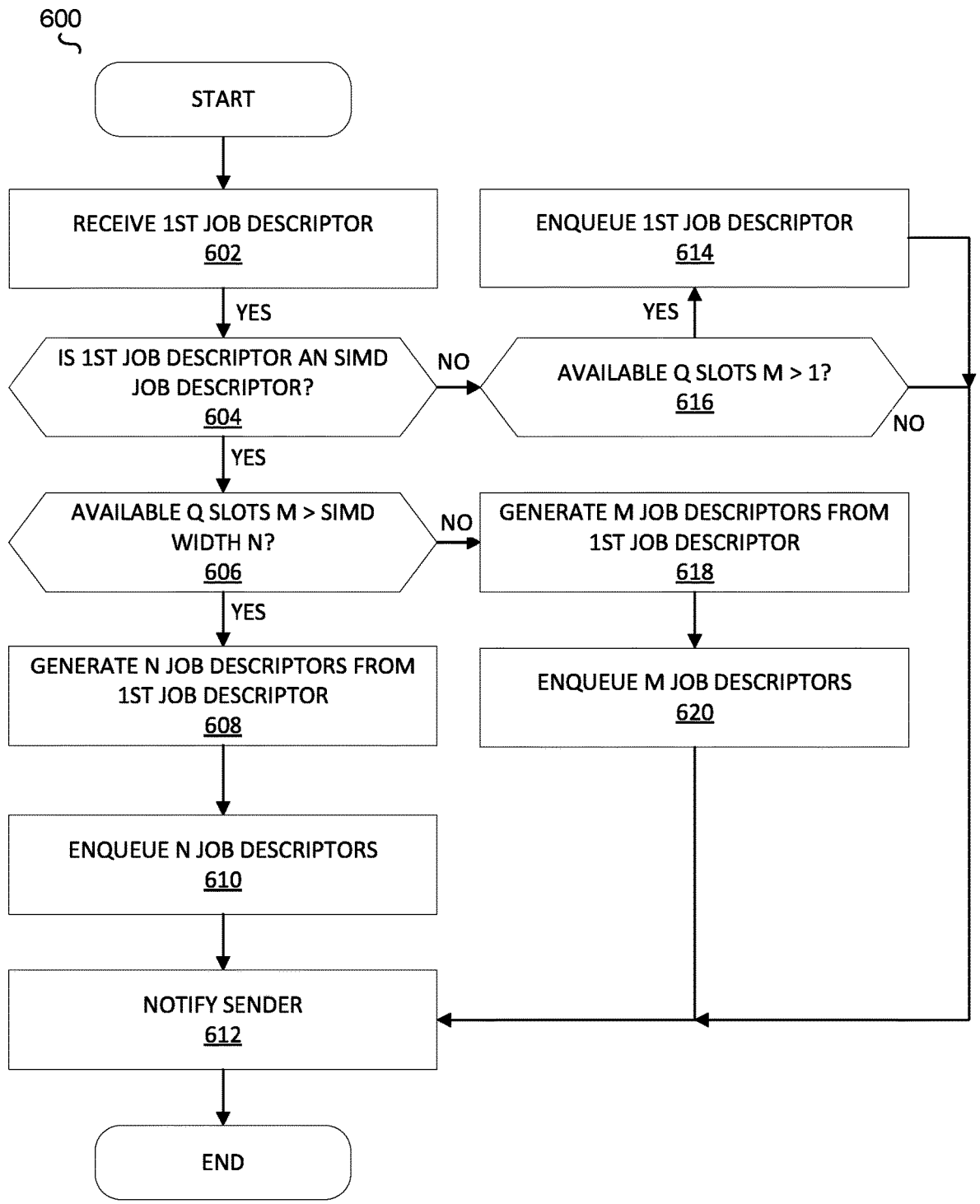
FIG. 6 is a flow diagram illustrating a method for processing a job descriptor according to an embodiment.

FIG. 6 is a flow diagram illustrating a method for processing a job descriptor according to an embodiment of the present invention. Method 600 may be performed by an accelerator, such as accelerator 220 of FIG. 2. More specifically, method 600 may be implemented via the enqueuing logic associated with an accelerator, such as the enqueue circuitry 222 of FIG. 2. Method 6 begins at the Start block and continues to block 602 where a first job descriptor is received. The first job descriptor may include various fields, such as those illustrated in job descriptor 400 of FIG. 4. At block 604, a determination is made on whether the first job descriptor is an SIMD job descriptor. This may be accomplished by examining one or more fields of the first job descriptor. According to an embodiment, the first job descriptor includes an SIMD width field to indicate the number of job descriptors that are included in, or to be generated from, the first job descriptor. The value of the SIMD width may be 1, 2, 4, or any other value depending on the implementation. In one embodiment, an SIMD width that is greater than 1 serves as indication that the first job descriptor is an SIMD job descriptor. Conversely, an SIMD width that is not greater than 1 is an indication that the first job descriptor is not an SIMD job descriptor. While the SIMD width is described herein for identifying SIMD descriptors, in some embodiments, the SIMD indication may be provided by a separate SIMD bit.

Referring still to block 604, if the first job descriptor is not an SIMD job descriptor, then at block 616, a determination is made on whether an open slot is available to store the first job descriptor. If so, at block 614, the first job descriptor is stored into the open slot to await processing. If no open slot is available, then at block 612, the sender is notified that the first job descriptor was not enqueued. In one embodiment, an error message or interrupt may be sent. Alternatively, or in addition to, a completion record may be generated and stored into the memory based on the completion record address field of the first job descriptor. The completion record may include an indication that the first job descriptor was not enqueued and thereby not completed. The indication may prompt the sender to resubmit the first job descriptor or to perform the job of the first job descriptor via another method, such as through a software routine.

Referring back to block 604, if the first job descriptor is determined to be an SIMD job descriptor, then at block 606, a determination is made on whether there are enough open slots in the job descriptor queues to accommodate the number of job descriptors included, or to be generated from, the first job descriptor. According to an embodiment, if the number of open slots in the job descriptor queues (M) is greater than the SIMD width of the first job descriptor (N), then a number of new job descriptors are generated from the first job descriptor at block 608. According to an embodiment, values from various fields of the first job descriptor, such as source addresses and corresponding transfer sizes, destination address and maximum destination size, completion record address and completion record size may be used to generate values for corresponding fields of the new job descriptors. The fields may be generated in accordance to the pseudo codes provided above. One or more other fields from the first job descriptor may be copied over to the new job descriptors. At block 610, the newly generated job descriptors are stored in the open slots of the job descriptor queue. At block 612, the sender of the first job descriptor may be notified that the enqueue operation via the SIMD job descriptor was successful.

Returning to block 606, if the number of open slots (M) is less than the number of new job descriptors to be generated (N), as indicated by the SIMD width, then according to an embodiment, only a subset of the job descriptors will be generated at block 618. The number of new job descriptors generated may equal the number of open descriptor slots. For example, if the SIMD width is 4 and the number of open slots is 3, then only three new job descriptors may be generated from the first job descriptor. Alternatively, all four job descriptors may be generated but only the three of them are be enqueued. At block 620, the generated job descriptors are enqueued into open descriptor slots. The sender may be notified, at block 612, that the enqueue operation was completed. The notification may include an indication that at least some of the job descriptors are not successfully enqueued. The notification may identify which of the jobs or job descriptors were not successfully enqueued and may prompt the sender to resubmit a request for the identified jobs or to perform them using other methods. The notification may be sent through a message or via a completion record stored to the memory.

Figure 7:
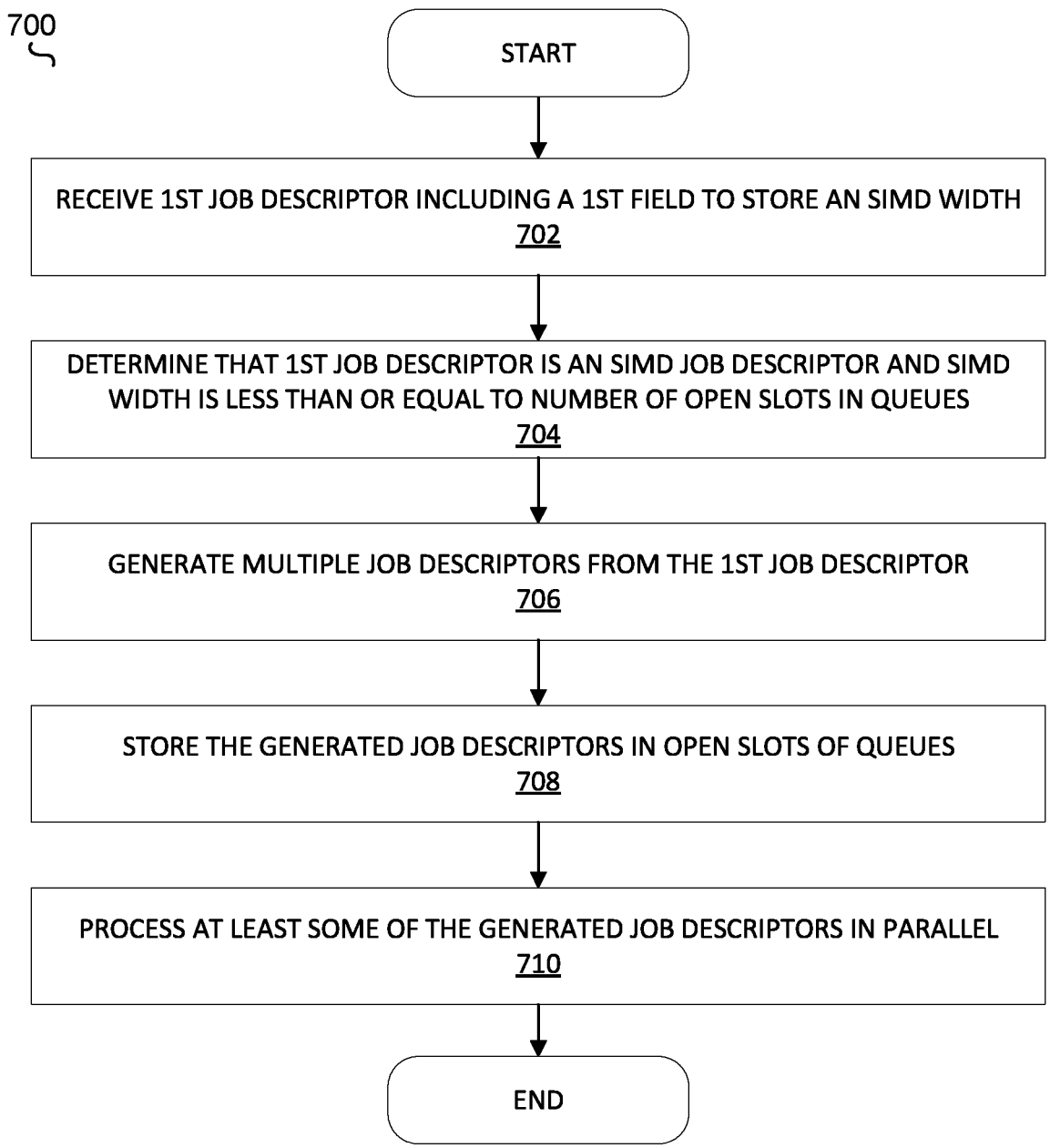
FIG. 7 is a block diagram illustrating another embodiment of a method to process job descriptors.

FIG. 7 is block diagram illustrating a method for processing an SIMD job descriptor according to embodiments of the present invention. Method 700 may be performed by an accelerator such as hardware accelerator 220 of FIG. 2. Method 700 begins at the Start block and continues to block 702. At block 702, a first job descriptor is received. The first job descriptor may include a plurality of fields, including one that stores an SIMD width. At block 704, it is determined that the first job descriptor is an SIMD job descriptor based on the SIMD width and that the SIMD width is less than or equal to the number of open slots in one or more descriptor queues. At block 706, multiple job descriptors are generated based on the fields of the first job descriptor. Some fields of the first job descriptor may be copied directly to corresponding fields in the new job descriptors. Some fields of the first job descriptor may be used to compute new values for various fields of the new job descriptors. At block 708, the generated job descriptors are stored into open slots of the descriptor queues. At block 710, the generated job descriptors are processed by acceleration engines or processing pipelines of the accelerator. At least some of the generated job descriptors are processed concurrently or in parallel with other generated job descriptors.

Examples

The following are example implementations of different embodiments of the invention.

Example 1. An apparatus including: a plurality of job descriptor queues to stores job descriptors describing work to be performed and enqueue circuitry to receiving a first job descriptor. The first job descriptor comprising a plurality of fields including a first field to store a Single Instruction Multiple Data (SIMD) width. If the SIMD width indicates that the first job descriptor is an SIMD job descriptor and the SIMD width is less than or equal to a number of open job descriptor slots in the plurality of job descriptor queues, the enqueue circuitry is to generate a plurality of job descriptors based on fields of the first job descriptor and store the plurality of job descriptors in the open job descriptor slots of the plurality of job descriptor queues. The apparatus further includes a plurality of processing pipelines to process job descriptors stored in the plurality of job descriptor queues to perform the work described. At least some of the plurality of job descriptors generated from the first job descriptor are processed in parallel by the processing pipelines.

Example 2. The apparatus of Example 1, wherein if the SIMD width is greater than the number of open job descriptor slots, the enqueue circuitry is to notify a sender of the first job descriptor that at least some of the work described by the first descriptor or the plurality of job descriptors generated from the first job descriptor are not performed.

Example 3. The apparatus of Example 2, wherein if the SIMD width is greater than the number of open job descriptor slots, then neither the first job descriptor nor any job descriptors generated therefrom are stored into the plurality of job descriptor queues.

Example 4. The apparatus of Example 2, wherein if the SIMD width indicates that the first job descriptor is an SIMD job descriptor and the SIMD width is greater than the number of open job descriptor slots, the enqueue circuitry is to generate a subset of the plurality of job descriptors based on fields of the first job descriptor and to store the subset of job descriptors in the plurality of job descriptor queues, wherein a number of job descriptors in the subset equals the number of open job descriptor slots in the plurality of job descriptor queues.

Example 5. The apparatus of Example 2, wherein if the SIMD width indicates that the first job descriptor is not an SIMD job descriptor, the enqueue circuitry is to store the first job descriptor into one of the plurality of descriptor queues.

Example 6. The apparatus of Example 1, the enqueue circuitry is to further to generate one or more source addresses, a destination address, and a completion record address for each of the plurality of job descriptors using fields of the first job descriptor.

Example 7. The apparatus of Example 6, wherein the first job descriptor includes fields to store a plurality of starting addresses and a corresponding address size for each starting address, wherein the enqueue circuitry is to recursively add a first address size to a corresponding first starting address to generate an address value for each of the plurality of job descriptors, the address value to be used as the source address, the destination address, or the completion record address for filling out fields of the plurality of job descriptors.

Example 8. The apparatus of Example 1, wherein a combination completion record is generated when performance of all of the work described by the plurality to job descriptors generated from the first job descriptor is complete.

Example 9. The apparatus of Example 8, wherein a completion record is generated for each of the plurality of job descriptors when performance of the work described by the job descriptor is completed by a corresponding processing pipeline.

Example 10. The apparatus of Example 1, wherein the work to be performed includes decompressing a memory region specified by the job descriptor.

Example 11. The apparatus of Example 1, wherein SIMD width may be a value of 1, 2, or 4.

Example 12. The apparatus of Example 11, wherein the first job descriptor is an SIMD job descriptor when the SIMD width is greater than 1.

Example 13. The apparatus of Example 11, wherein the first job descriptor is not an SIMD job descriptor when the SIMD width is equal to 1.

Example 14. A method that includes: receiving a first job descriptor comprising a plurality of fields including a first field to store a Single Instruction Multiple Data (SIMD) width; determining that the first job descriptor is an SIMD job descriptor based on the SIMD width and the SIMD width is less than or equal to a number of open job descriptor slots in a plurality of job descriptor queues for storing job descriptors, and responsively generating a plurality of job descriptors based on fields of the first job descriptor and storing the plurality of job descriptors in the open job descriptor slots of the plurality of job descriptor queues; and processing each job descriptors stored in the plurality of job descriptor queues to perform work described by the job descriptor, wherein at least some of the plurality of job descriptors generated from the first job descriptor are processed in parallel.

Example 15. The method of Example 14, further comprising determining that the SIMD width is greater than the number of open job descriptor slots and responsively notifying a sender of the first job descriptor that at least some of the work described by the first descriptor or the plurality of job descriptors generated from the first job descriptor are not performed.

Example 16. The method of Example 15, further comprising determining that the first job descriptor is an SIMD job descriptor based on the SIMD width and the SIMD width is greater than the number of open job descriptor slots, and responsively generating a subset of the plurality of job descriptors based on fields of the first job descriptor and storing the subset of job descriptors in the plurality of job descriptor queues, wherein a number of job descriptors in the subset equals the number of open job descriptor slots in the plurality of job descriptor queues.

Example 17. The method of Example 15, further comprising determining that the first job descriptor is not an SIMD job descriptor based on the SIMD width and responsively storing the first job descriptor into one of the plurality of descriptor queues.

Example 18. The method of Example 14, further comprising generating one or more source addresses, a destination address, and a completion record address for each of the plurality of job descriptors using fields of the first job descriptor.

Example 19. The method of Example 18, further including: storing in the fields of the first job descriptor a plurality of starting addresses and a corresponding address size for each starting address; and recursively adding a first address size to a corresponding first starting address to generate an address value for each of the plurality of job descriptors, the address value comprising one of the source address, the destination address, or the completion record address for filling out fields of the plurality of job descriptors.

Example 20. The method of Example 14, further comprising generating a combination completion record when performance of all of the work described by the plurality to job descriptors generated from the first job descriptor is complete.

Example 21. The method of Example 20, further comprising generating a completion record for each of the plurality of job descriptors when performance of the work described by the job descriptor is completed.

Example 22. The method of Example 14, wherein the work to be performed includes decompressing a memory region specified by the job descriptor.

Example 23. The method of Example 14, wherein SIMD width may be a value of 1, 2, or 4.

Example 24. The method of Example 23, wherein the first job descriptor is an SIMD job descriptor when the SIMD width is greater than 1.

Example 25. The method of Example 23, wherein the first job descriptor is not an SIMD job descriptor when the SIMD width is equal to 1.

Exemplary Processor Architectures and Data Types

Figure 8:
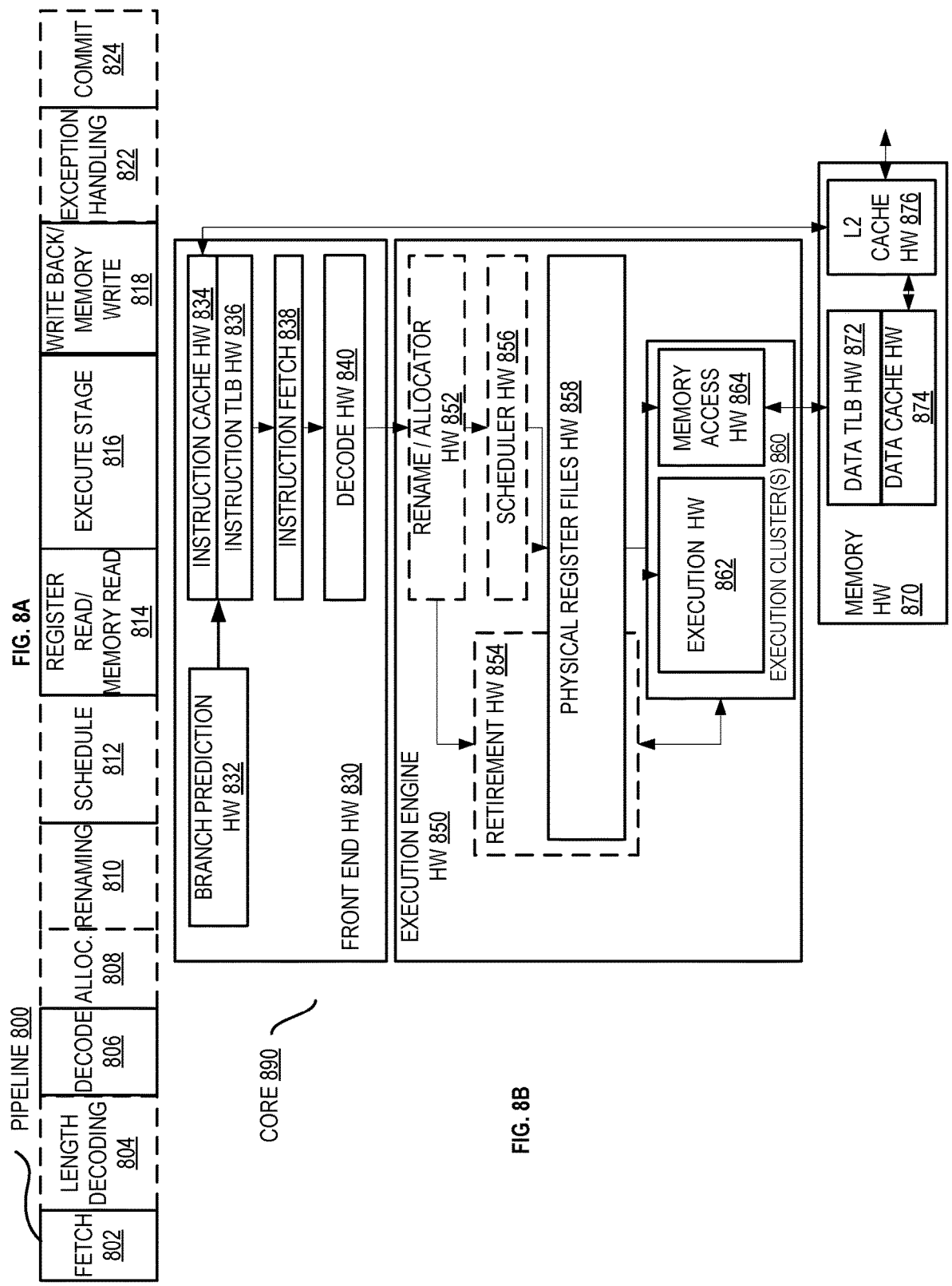
FIG. 8A is a block diagram illustrating both an exemplary in-order pipeline and an exemplary register renaming, out-of-order issue/execution pipeline according to embodiments of the invention.
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end hardware 830 coupled to an execution engine hardware 850, and both are coupled to a memory hardware 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end hardware 830 includes a branch prediction hardware 832 coupled to an instruction cache hardware 834, which is coupled to an instruction translation lookaside buffer (TLB) 836, which is coupled to an instruction fetch hardware 838, which is coupled to a decode hardware 840. The decode hardware 840 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode hardware 840 or otherwise within the front end hardware 830). The decode hardware 840 is coupled to a rename/allocator hardware 852 in the execution engine hardware 850.

The execution engine hardware 850 includes the rename/allocator hardware 852 coupled to a retirement hardware 854 and a set of one or more scheduler hardware 856. The scheduler hardware 856 represents any number of different schedulers, including reservations stations, central instruction window, etc. The scheduler hardware 856 is coupled to the physical register file(s) hardware 858. Each of the physical register file(s) hardware 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 858 comprises a vector registers hardware, a write mask registers hardware, and a scalar registers hardware. This register hardware may provide architectural vector registers, vector mask registers, and general purpose registers. The physical register file(s) hardware 858 is overlapped by the retirement hardware 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 854 and the physical register file(s) hardware 858 are coupled to the execution cluster(s) 860. The execution cluster(s) 860 includes a set of one or more execution hardware 862 and a set of one or more memory access hardware 864. The execution hardware 862 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 856, physical register file(s) hardware 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 864). It should also be understood that where separate pipelines are used, one or more of these pipelines may be out-of-order issue/execution and the rest in-order.

The set of memory access hardware 864 is coupled to the memory hardware 870, which includes a data TLB hardware 872 coupled to a data cache hardware 874 coupled to a level 2 (L2) cache hardware 876. In one exemplary embodiment, the memory access hardware 864 may include a load hardware, a store address hardware, and a store data hardware, each of which is coupled to the data TLB hardware 872 in the memory hardware 870. The instruction cache hardware 834 is further coupled to a level 2 (L2) cache hardware 876 in the memory hardware 870. The L2 cache hardware 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode hardware 840 performs the decode stage 806; 3) the rename/allocator hardware 852 performs the allocation stage 808 and renaming stage 810; 4) the scheduler hardware 856 performs the schedule stage 812; 5) the physical register file(s) hardware 858 and the memory hardware 870 perform the register read/memory read stage 814; the execution cluster 860 perform the execute stage 816; 6) the memory hardware 870 and the physical register file(s) hardware 858 perform the write back/memory write stage 818; 7) various hardware may be involved in the exception handling stage 822; and 8) the retirement hardware 854 and the physical register file(s) hardware 858 perform the commit stage 824.

The core 890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 890 includes logic to support a packed data instruction set extension (e.g., AVX1, AVX2, and/or some form of generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 834/874 and a shared L2 cache hardware 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
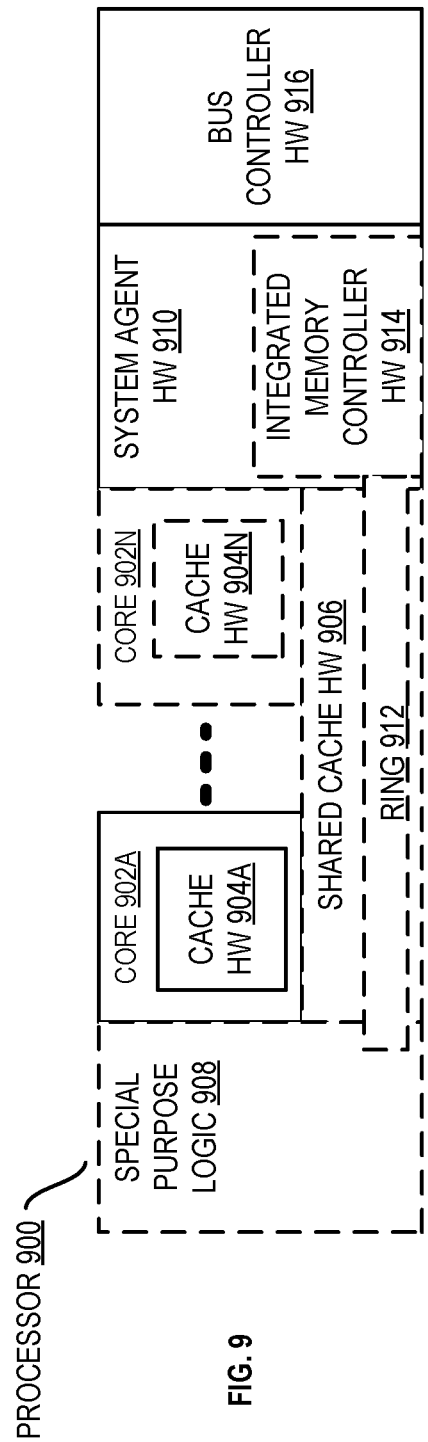
FIG. 9 is a block diagram of a single core processor and a multicore processor with integrated memory controller and graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller hardware 916, while the optional addition of the dashed lined boxes illustrates an alternative processor 900 with multiple cores 902A-N, a set of one or more integrated memory controller hardware 914 in the system agent hardware 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 906, and external memory (not shown) coupled to the set of integrated memory controller hardware 914. The set of shared cache hardware 906 may include one or more mid-level caches, such as level 2 (L2), level 3 (L3), level 4 (L4), or other levels of cache, a last level cache (LLC), and/or combinations thereof. While in one embodiment a ring based interconnect hardware 912 interconnects the integrated graphics logic 908, the set of shared cache hardware 906, and the system agent hardware 910/integrated memory controller hardware 914, alternative embodiments may use any number of well-known techniques for interconnecting such hardware. In one embodiment, coherency is maintained between one or more cache hardware 906 and cores 902-A-N.

In some embodiments, one or more of the cores 902A-N are capable of multi-threading. The system agent 910 includes those components coordinating and operating cores 902A-N. The system agent hardware 910 may include for example a power control unit (PCU) and a display hardware. The PCU may be or include logic and components needed for regulating the power state of the cores 902A-N and the integrated graphics logic 908. The display hardware is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set. In one embodiment, the cores 902A-N are heterogeneous and include both the "small" cores and "big" cores described below.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
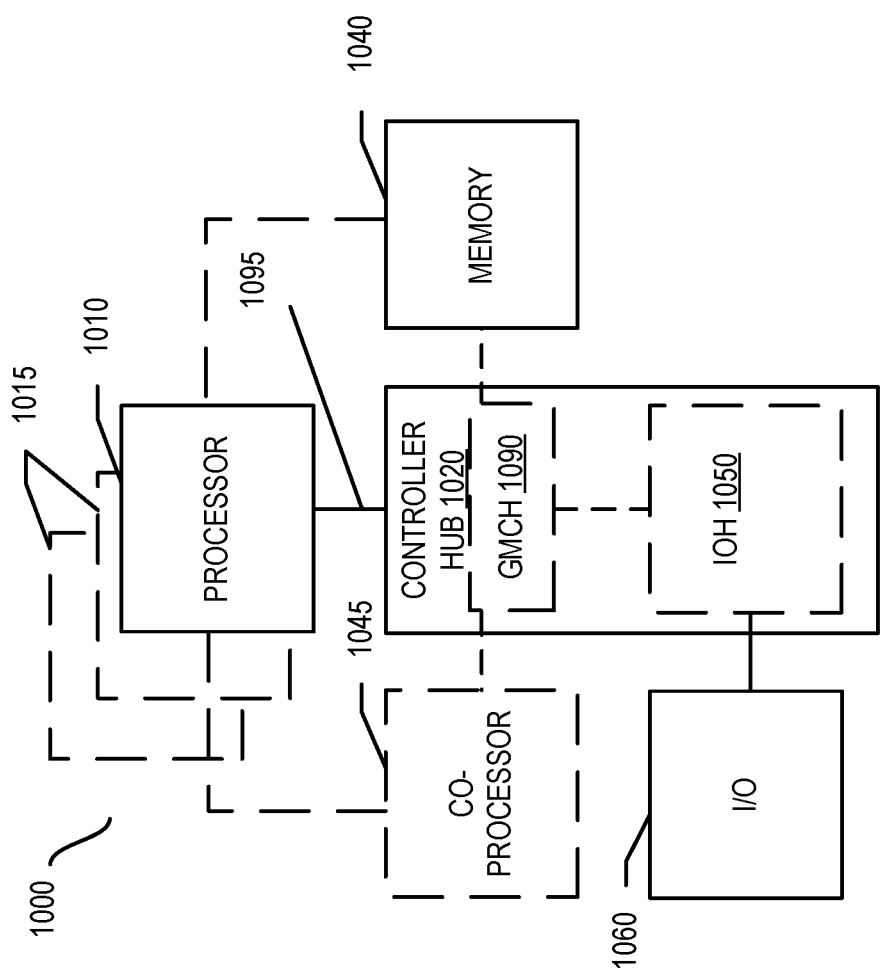
FIG. 10 illustrates a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface, or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
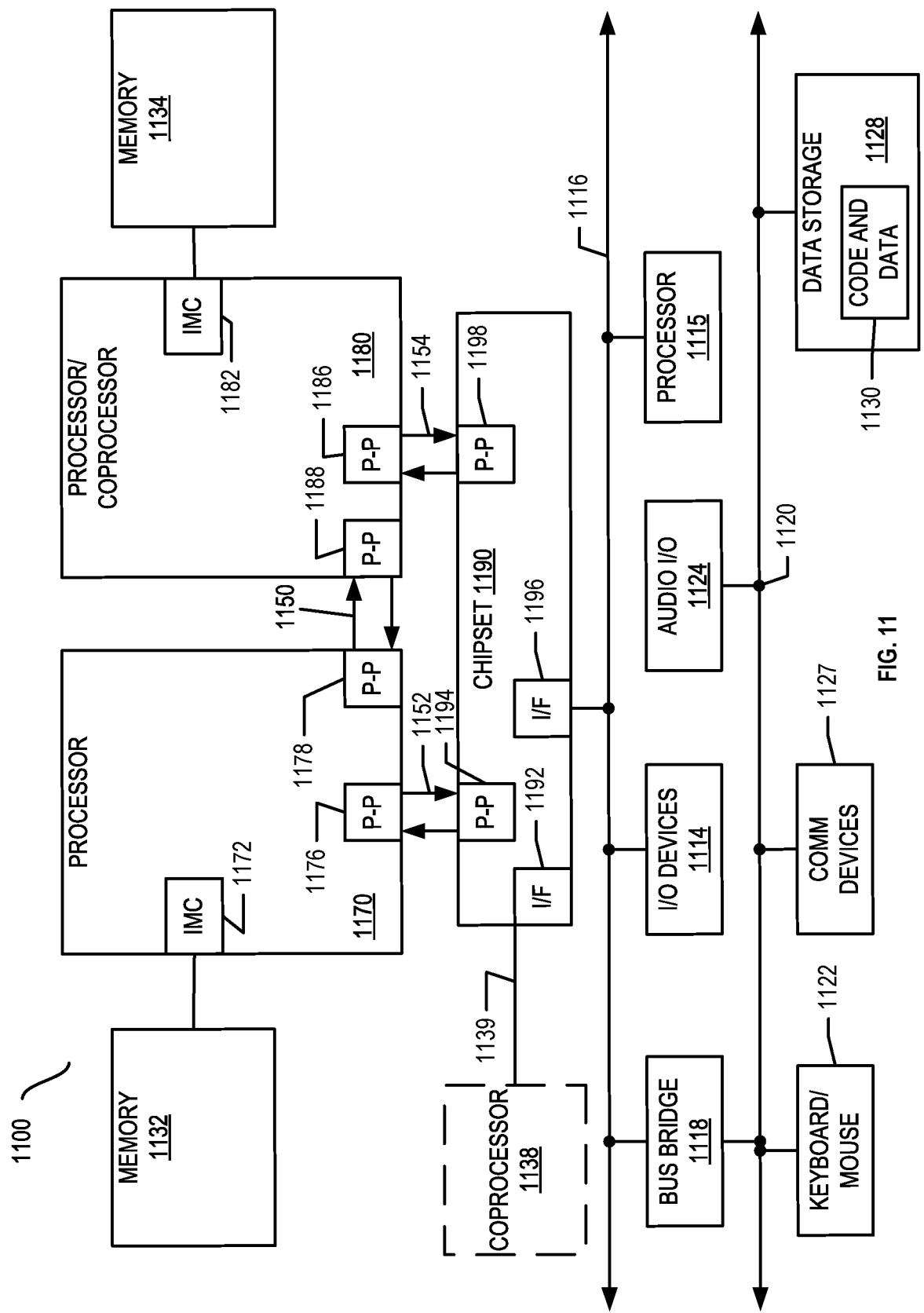
FIG. 11 illustrates a block diagram of a second system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) hardware 1172 and 1182, respectively. Processor 1170 also includes as part of its bus controller hardware point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) hardware), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage hardware 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
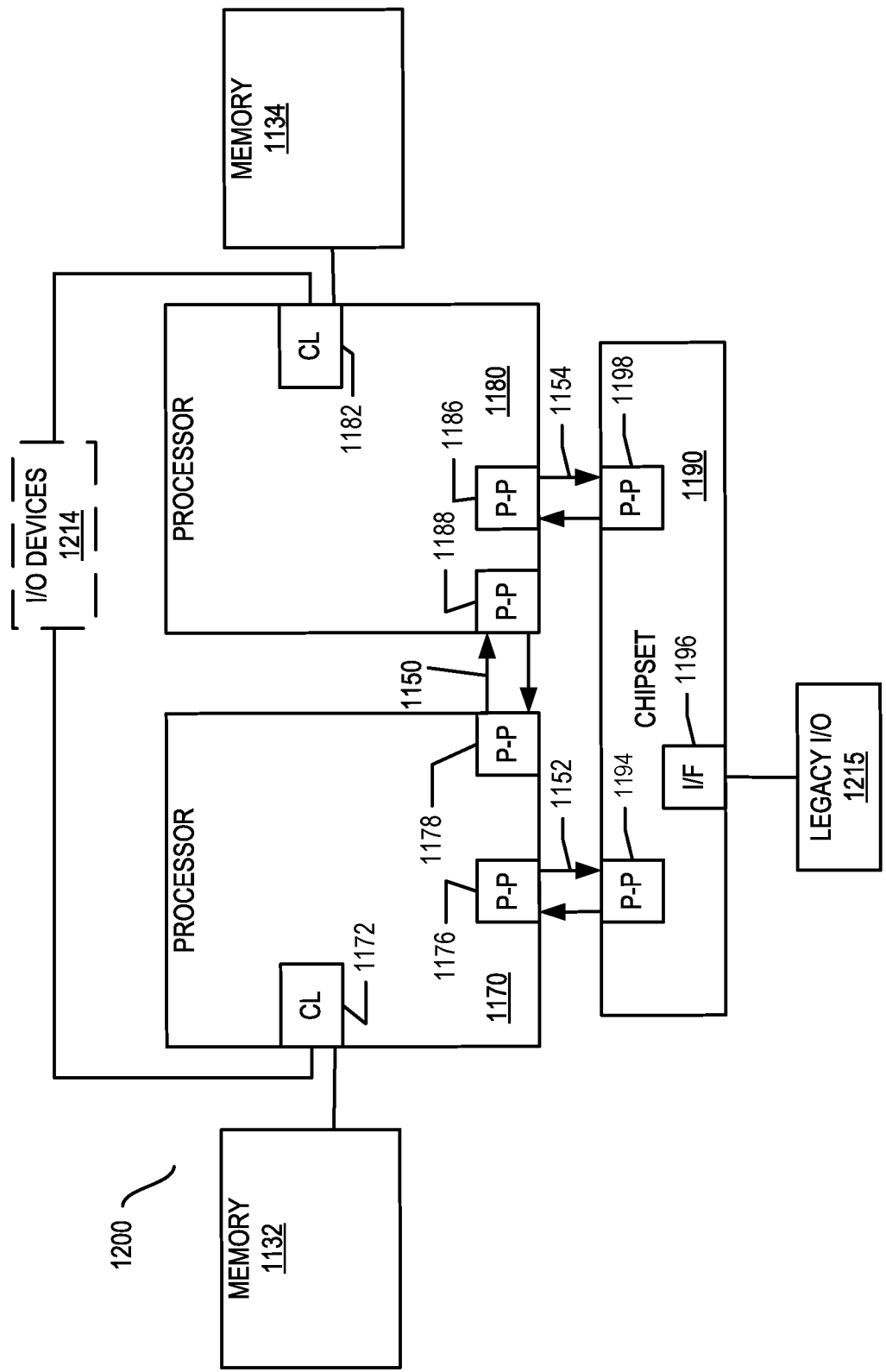
FIG. 12 illustrates a block diagram of a third system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller hardware and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
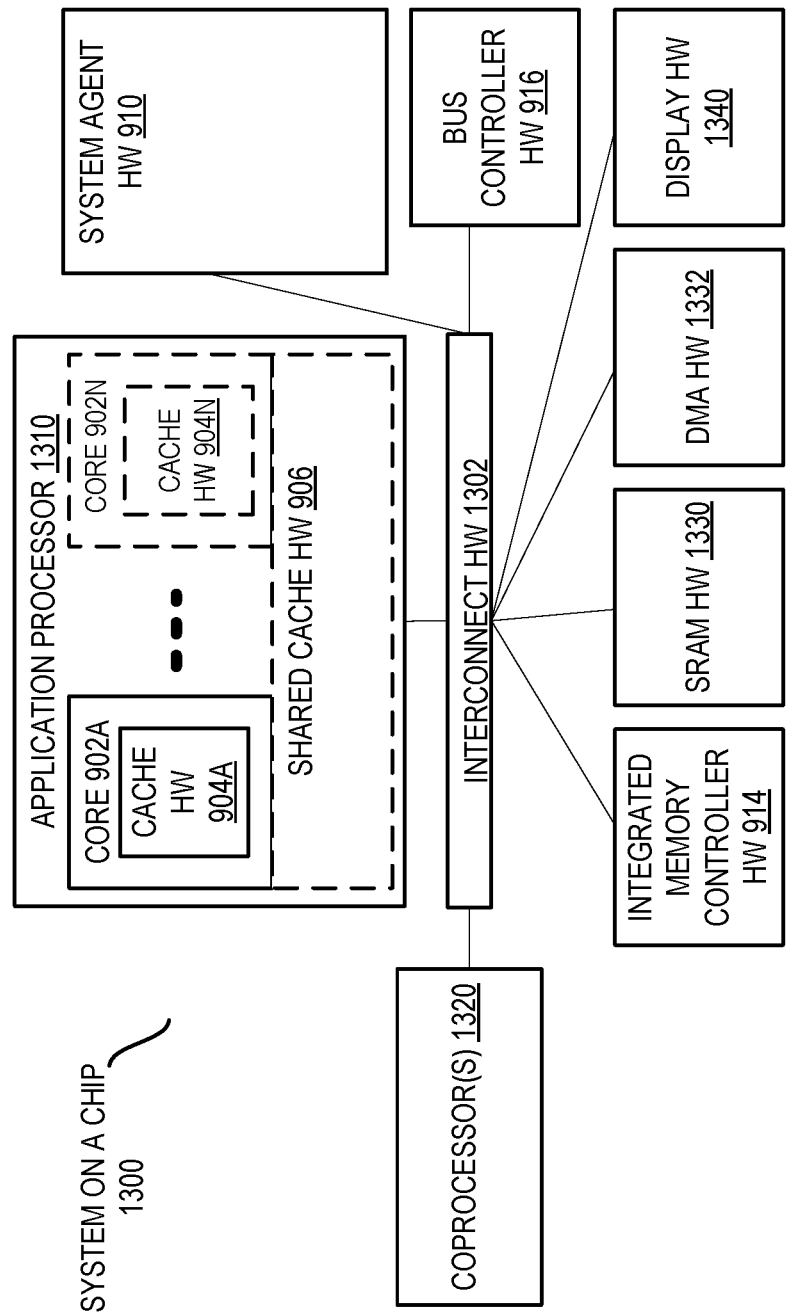
FIG. 13 illustrates a block diagram of a system on a chip (SoC) in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect hardware 1302 is coupled to: an application processor 1310 which includes a set of one or more cores 902A-N and shared cache hardware 906; a system agent hardware 910; a bus controller hardware 916; an integrated memory controller hardware 914; a set or one or more coprocessors 1320 which may include integrated graphics logic, an image processor, an audio processor, and a video processor; an static random access memory (SRAM) hardware 1330; a direct memory access (DMA) hardware 1332; and a display hardware 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. An apparatus comprising:
a plurality of job descriptor queues to store job descriptors describing work to be performed;
enqueue circuitry to receive a first job descriptor, the first job descriptor comprising a plurality of fields including a first field to store a Single Instruction Multiple Data (SIMD) width, wherein when the SIMD width indicates that the first job descriptor is an SIMD job descriptor and the SIMD width is less than or equal to a number of open job descriptor slots in the plurality of job descriptor queues, the enqueue circuitry is to generate a plurality of job descriptors based on fields of the first job descriptor and store the plurality of job descriptors in the open job descriptor slots of the plurality of job descriptor queues; and
one or more processing pipelines to process job descriptors stored in the plurality of job descriptor queues to perform the work described, wherein at least some of the plurality of job descriptors generated from the first job descriptor are processed in parallel by the one or more processing pipelines.

2. The apparatus of claim 1, wherein when the SIMD width is greater than the number of open job descriptor slots, the enqueue circuitry is to notify a sender of the first job descriptor that at least some of the work described by the first descriptor or the plurality of job descriptors generated from the first job descriptor are not performed.

3. The apparatus of claim 2, wherein when the SIMD width is greater than the number of open job descriptor slots, then neither the first job descriptor nor any job descriptors generated therefrom are stored into the plurality of job descriptor queues.

4. The apparatus of claim 2, wherein when the SIMD width indicates that the first job descriptor is an SIMD job descriptor and the SIMD width is greater than the number of open job descriptor slots, the enqueue circuitry is to generate a subset of the plurality of job descriptors based on fields of the first job descriptor and to store the subset of job descriptors in the plurality of job descriptor queues, wherein a number of job descriptors in the subset equals the number of open job descriptor slots in the plurality of job descriptor queues.

5. The apparatus of claim 2, wherein if the SIMD width indicates that the first job descriptor is not an SIMD job descriptor, the enqueue circuitry is to store the first job descriptor into one of the plurality of job descriptor queues.

6. The apparatus of claim 1, the enqueue circuitry is to further to generate one or more source addresses, a destination address, and a completion record address for each of the plurality of job descriptors using fields of the first job descriptor.

7. The apparatus of claim 6, wherein the first job descriptor comprises fields to store a plurality of starting addresses and a corresponding address size for each starting address, wherein the enqueue circuitry is to recursively add a first address size to a corresponding first starting address to generate an address value for each of the plurality of job descriptors, the address value to be used as the source address, the destination address, or the completion record address for filling out fields of the plurality of job descriptors.

8. The apparatus of claim 1, wherein a combination completion record is generated when performance of all of the work described by the plurality of job descriptors generated from the first job descriptor is complete.

9. The apparatus of claim 8, wherein a completion record is generated for each of the plurality of job descriptors when performance of the work described by the job descriptor is completed by a corresponding processing pipeline.

10. The apparatus of claim 1, wherein the work to be performed comprises decompressing a memory region specified by the job descriptor.

11. The apparatus of claim 1, wherein SIMD width comprises a value of 1, 2, or 4.

12. The apparatus of claim 11, wherein the first job descriptor is an SIMD job descriptor when the SIMD width is greater than 1.

13. The apparatus of claim 11, wherein the first job descriptor is not an SIMD job descriptor when the SIMD width is equal to 1.

14. A method comprising:
receiving a first job descriptor comprising a plurality of fields including a first field to store a Single Instruction Multiple Data (SIMD) width;
determining that the first job descriptor is an SIMD job descriptor based on the SIMD width and the SIMD width is less than or equal to a number of open job descriptor slots in a plurality of job descriptor queues for storing job descriptors, and responsively generating a plurality of job descriptors based on fields of the first job descriptor and storing the plurality of job descriptors in the open job descriptor slots of the plurality of job descriptor queues; and
processing each job descriptors stored in the plurality of job descriptor queues to perform work described by the job descriptor, wherein at least some of the plurality of job descriptors generated from the first job descriptor are processed in parallel.

15. The method of claim 14, further comprising determining that the SIMD width is greater than the number of open job descriptor slots and responsively notifying a sender of the first job descriptor that at least some of the work described by the first descriptor or the plurality of job descriptors generated from the first job descriptor are not performed.

16. The method of claim 15, further comprising determining that the first job descriptor is an SIMD job descriptor based on the SIMD width and the SIMD width is greater than the number of open job descriptor slots, and responsively generating a subset of the plurality of job descriptors based on fields of the first job descriptor and storing the subset of job descriptors in the plurality of job descriptor queues, wherein a number of job descriptors in the subset equals the number of open job descriptor slots in the plurality of job descriptor queues.

17. The method of claim 15, further comprising determining that the first job descriptor is not an SIMD job descriptor based on the SIMD width and responsively storing the first job descriptor into one of the plurality of descriptor queues.

18. The method of claim 14, further comprising generating one or more source addresses, a destination address, and a completion record address for each of the plurality of job descriptors using fields of the first job descriptor.

19. The method of claim 18, further comprising:
storing in the fields of the first job descriptor a plurality of starting addresses and a corresponding address size for each starting address; and
recursively adding a first address size to a corresponding first starting address to generate an address value for each of the plurality of job descriptors, the address value comprising one of the source address, the destination address, or the completion record address for filling out fields of the plurality of job descriptors.

20. The method of claim 14, further comprising generating a combination completion record when performance of all of the work described by the plurality of job descriptors generated from the first job descriptor is complete.

21. The method of claim 20, further comprising generating a completion record for each of the plurality of job descriptors when performance of the work described by the job descriptor is completed.

22. The method of claim 14, wherein the work to be performed comprises decompressing a memory region specified by the job descriptor.

23. The method of claim 14, wherein SIMD width comprises a value of 1, 2, or 4.

24. The method of claim 23, wherein the first job descriptor is an SIMD job descriptor when the SIMD width is greater than 1.

25. The method of claim 23, wherein the first job descriptor is not an SIMD job descriptor when the SIMD width is equal to 1.

* * * * *